United States Patent
Röhm

[11] Patent Number: 5,829,761
[45] Date of Patent: Nov. 3, 1998

[54] DRILL CHUCK

[76] Inventor: Günter Horst Röhm, Heinrich-Röhm-Strasse 50, D-89567 Sontheim, Germany

[21] Appl. No.: 782,766

[22] Filed: Jan. 13, 1997

[30]      Foreign Application Priority Data

Jan. 17, 1996 [DE] Germany ................ 196 01 441.7

[51] Int. Cl.⁶ .................................................. B23B 31/12
[52] U.S. Cl. ............................ 279/62; 279/140; 279/902
[58] Field of Search ................................ 279/60–65, 140, 279/902

[56]             References Cited

FOREIGN PATENT DOCUMENTS 710519   5/1996   European Pat. Off. ............... 279/140

Primary Examiner—Steven C. Bishop
Attorney, Agent, or Firm—Herbert Dubno; Andrew Wilford

[57]             ABSTRACT

A drill chuck has a body centered on and rotatable about an axis and formed with a plurality of angled guides opening axially forward at a front chuck end and holding respective jaws and radially displaceable jaws each formed with a row of teeth. A metallic inner ring axially fixed but rotatable about the axis on the body has a screwthread meshing with the teeth so that rotation of the inner ring displaces the jaws in their guides. An adjustment sleeve rotatable about the axis on the body has a hard outer part and an inner part of a softer material fixed on the outer part. A metallic intermediate ring fixed on the inner ring has formations coupled to the hard outer part. The inner part rides on the intermediate ring.

15 Claims, 5 Drawing Sheets

DRILL CHUCK

FIELD OF THE INVENTION

The present invention relates to a drill chuck. More particularly this invention concerns a lockable drill chuck of the keyless type.

BACKGROUND OF THE INVENTION

A standard drill chuck has a body centered on and rotatable about an axis and formed with a plurality of angled guides opening axially forward at a front chuck end and respective jaws axially and radially displaceable in the guides and each formed with a row of teeth. A metallic inner ring axially fixed but rotatable about the axis on the body has a screwthread meshing with the teeth so that rotation of the inner ring displaces the jaws in their guides. An adjustment sleeve is rotatable about the axis on the body on a metallic intermediate ring fixed on the inner ring and is coupled to the inner ring to rotate it and set the position of the jaws of the chuck.

In so-called keyless models of the chuck it is necessary to transmit considerable torque from the adjustment sleeve which is gripped by the user to the inner tightening ring. In particular in self-tightening and/or hammer drills it is often necessary to apply considerable torque to unclamp a tool. When the sleeve is made of plastic such torques occasionally damage the tool, and such a sleeve is easily damaged during normal use. Nonetheless making this part out of a harder material is normally considered impossible because of the weight that would add and the difficult of forming it with the necessary cam formations and the like it must have.

In a standard arrangement the intermediate ring has axially extending fingers that are loosely engaged in angularly elongated and axially open slots formed in the adjustment sleeve. As the fingers move angularly between the ends of the respective slots they open and close a mechanism that locks the tightening ring relative to the chuck body. Torque is transmitted from the sleeve to the intermediate ring, and thence to the inner tightening ring, by engagement of the fingers with the ends of the slots. When considerable torque must be exerted, the metallic fingers often deform or dig into the plastic sleeve.

OBJECTS OF THE INVENTION

It is therefore an object of the present invention to provide an improved drill chuck of the keyless type.

Another object is the provision of such an improved drill chuck of the keyless type which overcomes the above-given disadvantages, that is which is of durable and simple construction.

SUMMARY OF THE INVENTION

A drill chuck has according to the invention a body centered on and rotatable about an axis and formed with a plurality of angled guides opening axially forward at a front chuck end and holding respective jaws and radially displaceable jaws each formed with a row of teeth. A metallic inner ring axially fixed but rotatable about the axis on the body has a screwthread meshing with the teeth so that rotation of the inner ring displaces the jaws in their guides. An adjustment sleeve rotatable about the axis on the body has a hard outer part and an inner part of a softer material fixed on the outer part. A metallic intermediate ring fixed on the inner ring has formations coupled to the hard outer part. The inner part rides on the intermediate ring.

The hard, normally steel, outer sleeve part is resistant to damage during normal use so that if a wrench must be applied to it, for instance, it will not be ruined. Since the intermediate ring is coupled directly to this hard outer ring, no torque is transmitted by plastic parts and, therefore, the adjustment ring can be actuated forcibly without damage to it. On the other hand the inner part is made of plastic which can easily be formed, for instance by molding, to have a very complex shape and which can be counted on to ride smoothly on the metal intermediate ring.

According to the invention the sleeve is provided with means for rotationally arresting the inner and intermediate rings on the body. In particular the plastic inner part is formed with a cam for actuating the arresting means.

The outer part according to the invention can extend to a rear end of the chuck body and to the very front end of the chuck body. When the inner part is formed with angularly extending slots the intermediate ring has respective integral formations extending into the slots. These slots can be formed in a bent-over front end of the outer sleeve part. The outer part is frustoconically forwardly tapered at the front end of the chuck body. A shield sleeve centered on the axis surrounds the front end of the chuck body. The shield sleeve has a rear end immediately juxtaposed with a front edge of the outer part. The outer part extends to and covers the front end of the chuck body. In another arrangement the outer part has at the chuck-body front end a turned-back lip formed with angularly extending slots. The intermediate ring has respective formations extending into and loosely angularly received in the slots. It is also possible of the outer part to have a front end with an inwardly directed lip braced against the front end of the chuck body. In this case the chuck body is provided with a snap ring retaining the outer-part front end in place on the chuck-body front end. In any case the outer part has a milled or knurled outer surface.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
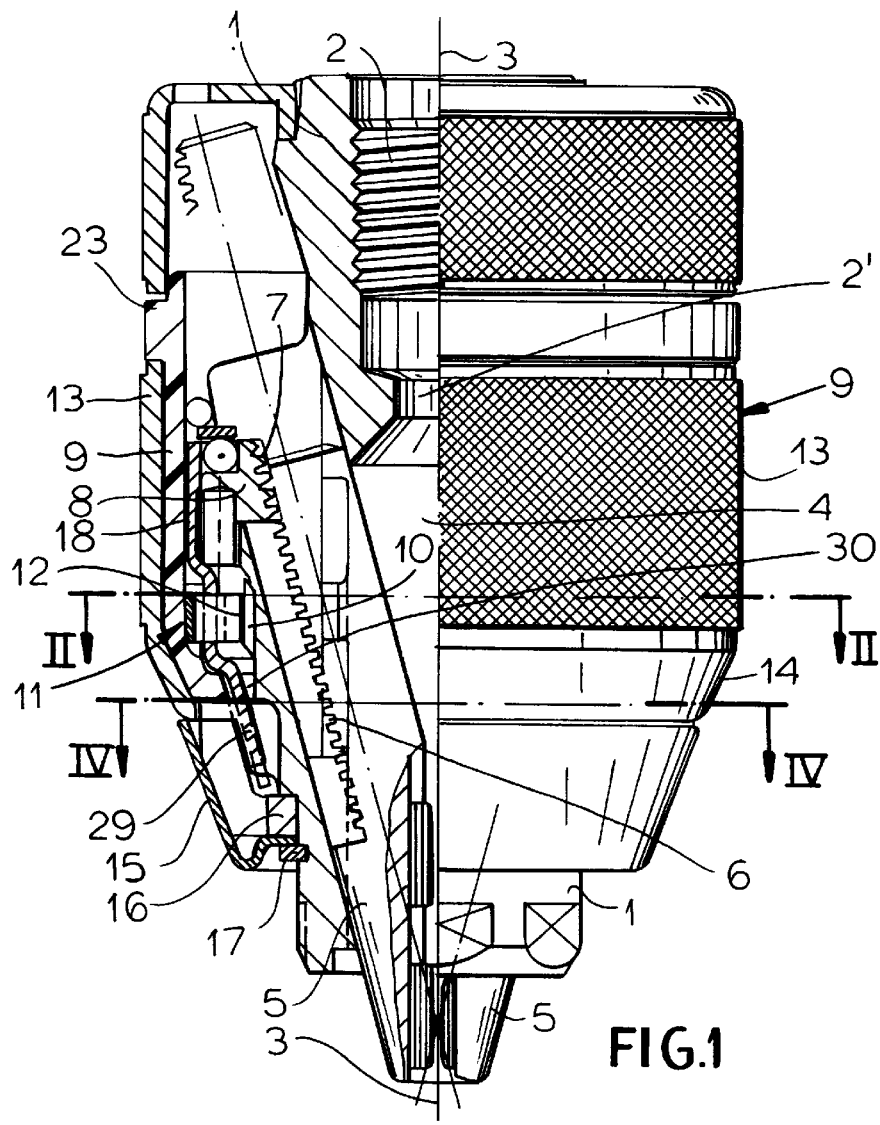
FIG. 1 is a chuck according to the invention partly in side view and partly in axial section.
Figure 4:
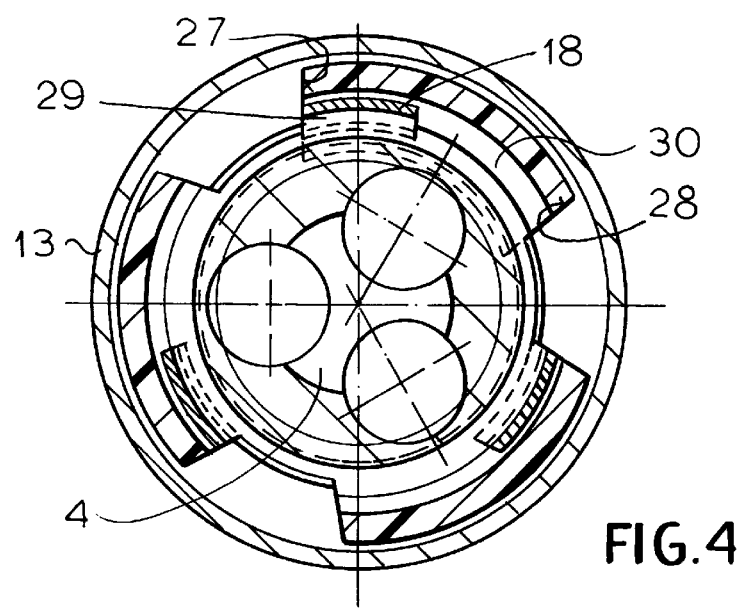
FIG. 4 is a section taken along line IV—IV of FIG. 1.
Figure 2:
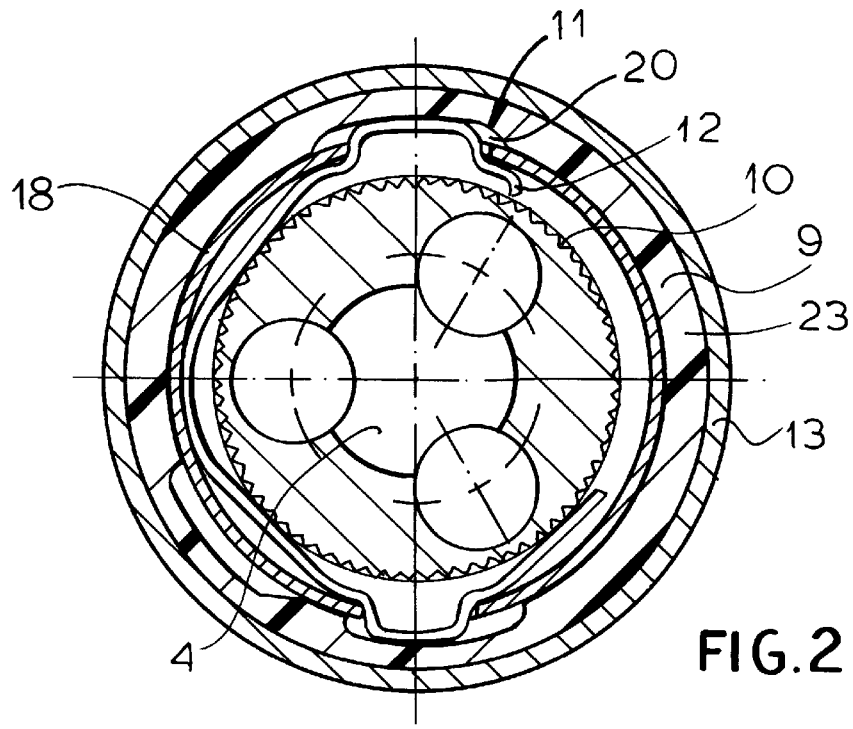
FIG. 2 is a section taken along line II—II of FIG. 1 with the chuck in the unlocked position.
Figure 3:
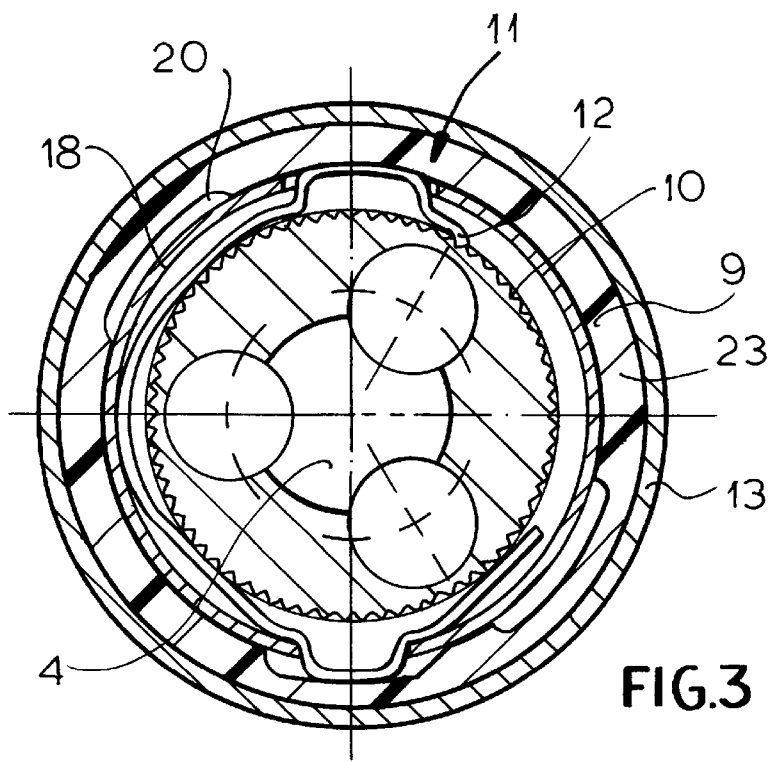
FIG. 3 is a view like FIG. 2 but with the chuck locked.

As seen in FIGS. 1 through 4 a chuck has a body 1 formed with a rearwardly open threaded hole 2 adapted to be mounted on the spindle of a drill unit for rotation of the chuck about an axis 3. The body 1 is further formed with an axially forwardly open tool-receiving recess 4 communicating with the hole 2 via a passage 2' so that a hammer rod can act directly on a tool in the recess 4. Three angularly equispaced jaws 5 are carried in angled guide passages formed in the body 1 and have outer edges formed with teeth 6 that mesh with a screwthread 7 of an inner actuating ring 8 that is axially fixed but rotatable on the body 1.

According to the invention a tightening sleeve 9 is formed by a metallic and tubular outer part 13 and a molded plastic inner part 23 that are rotationally fixed together, axially nondisplaceable on the body 1, and jointly rotatable about the axis 3 on the body 1. This sleeve 9 is rotationally coupled to the inner actuating ring 8 by a locking system 11 whose basic part is a spring-steel entrainment element 12 engageable in an annular array of outwardly open teeth 10 cut into the body 1. The inner actuating ring 8 carries a intermediate metal sleeve or guide ring 18 that rotationally supports the plastic inner part 23 of the sleeve 9 and that has three angularly equispaced and axially forwardly projecting abutment tongues 29 engaged in respective slots 30 cut into the metallic outer part 13. The inner sleeve part 23 is formed with cam recesses 20 that can coact with the element 12 to Move it radially between the outer unlocked position of FIG. 2 in which it is out of engagement with the teeth 10 and an inner locked position shown in FIG. 3 in which it rotationally looks the rings 8 and 18 to the body 1. Movement between these end positions is possible because the sleeve 9 can rotate through a predetermined angular distance relative to the sleeve 18 as the tongues 29 formed on the outer part 13 move between ends 27 and 28 of the slots 30 of the part 13.

Thus relative angular movement of the sleeve 9 and the rings 8 and 18 displaces the retaining spring 12 between the locked and unlocked positions. Engagement of the slot ends 27 and 28 with the tongues 29 of the ring IS couples the sleeve 9 to the rings 8 and 18 to allow the sleeve 9 to move the jaws 5 in or out. The coupling of the sleeve 9 to the inner actuating ring 9 is by direct engagement of the metallic outer sleeve part 13 with the metallic intermediate ring 18 that is fixed on the inner ring 8. None of the applied torque is transmitted via the plastic inner sleeve part 23 into which is molded the more complicated shape needed to turn on the guide sleeve 18, actuate the locking mechanism 11, and interfit with the outer metal part 13. The outer surface of the outer sleeve part 13 is milled as illustrate to provide a solid grip.

In FIGS. 1 through 4 the outer part 13 extends axially forward to the rear end of a shield sleeve or ring 15 having a front inner periphery engaged between a bearing 16 carried on the body 1 and a snap ring 17 set in the body 1. This shield 15 therefore protects the chuck in case it is bumped against the object being drilled.

Figure 5:
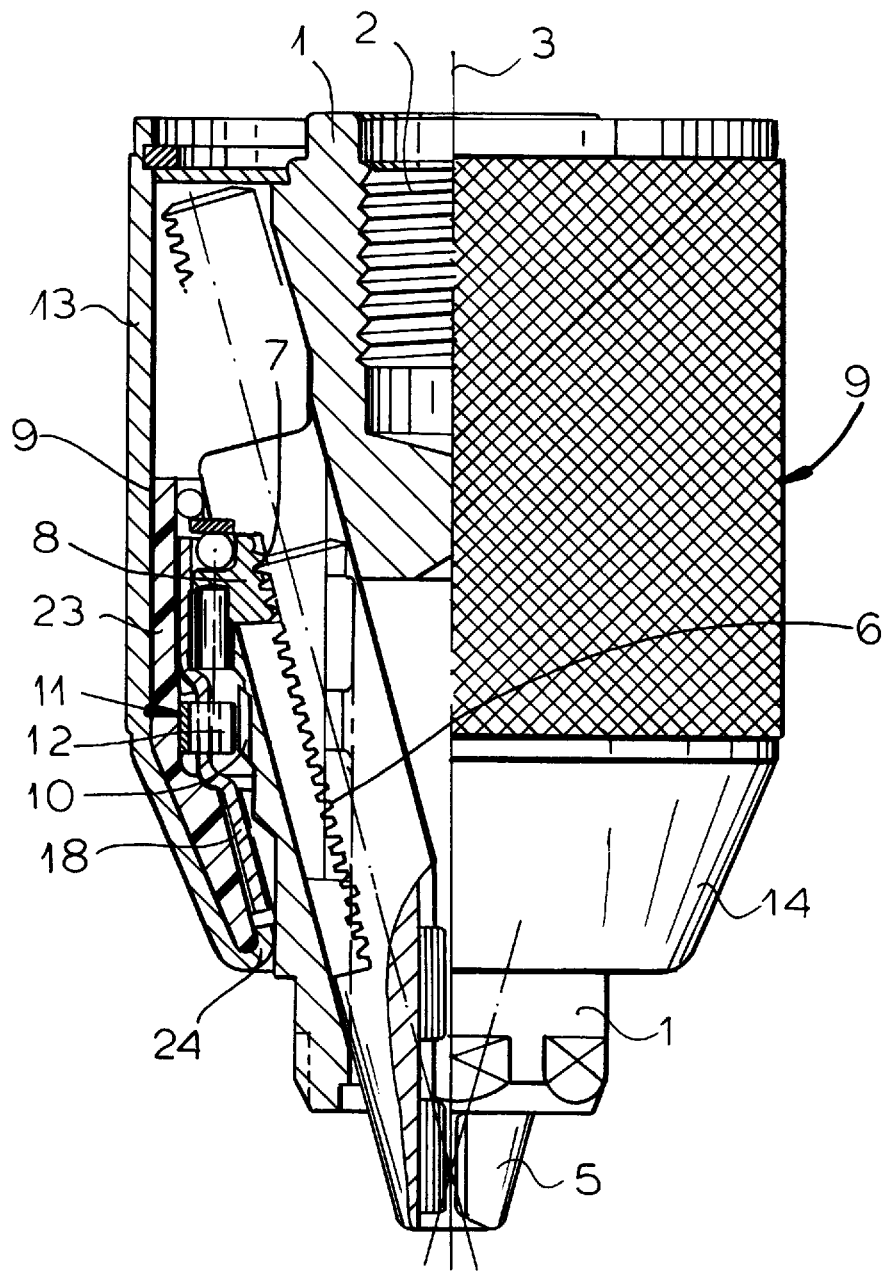
FIGS. 5, 6, and 7 are views like FIG. 1 of further chucks in accordance with this invention.
Figure 6:
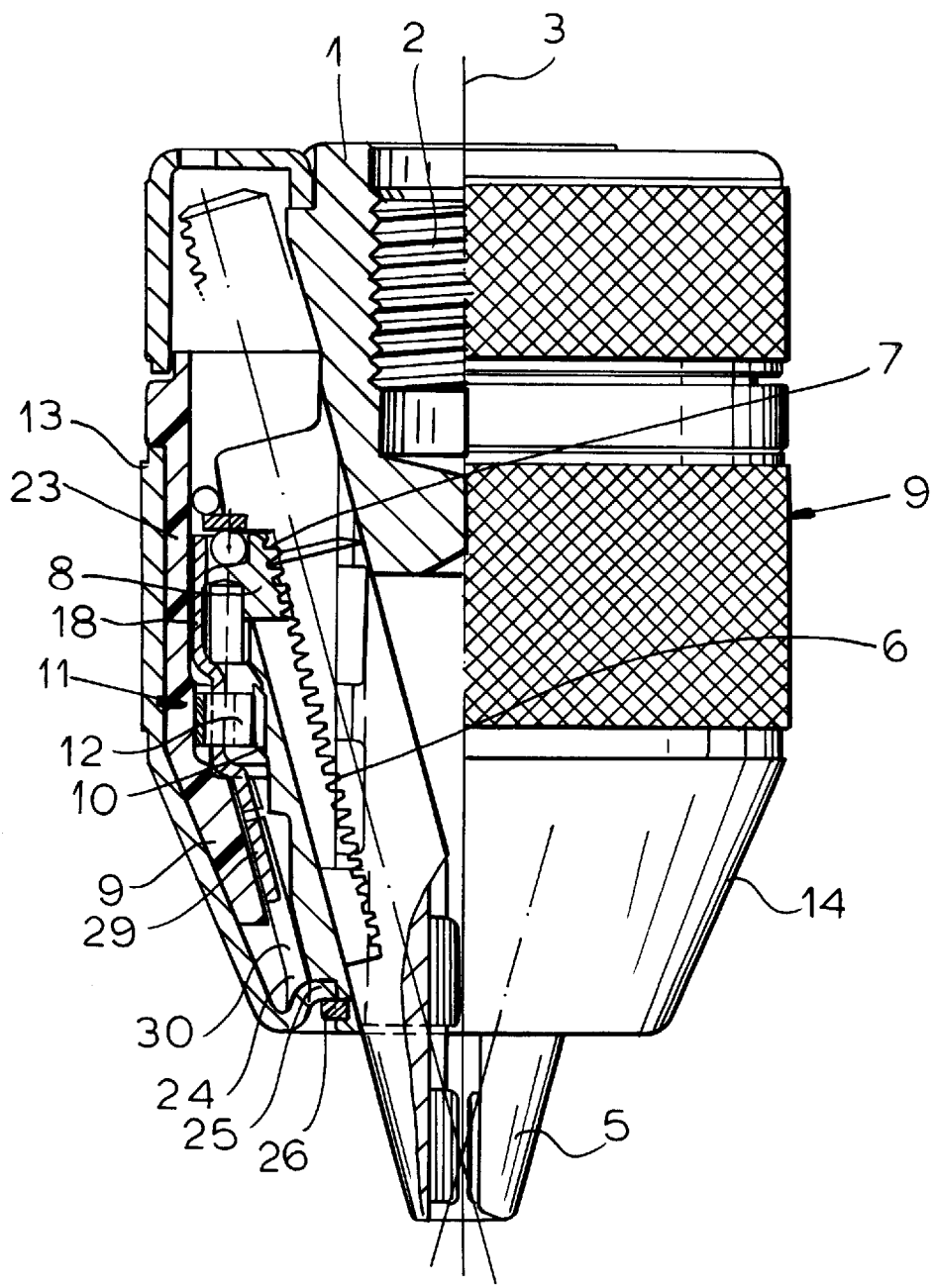
Figure 7:
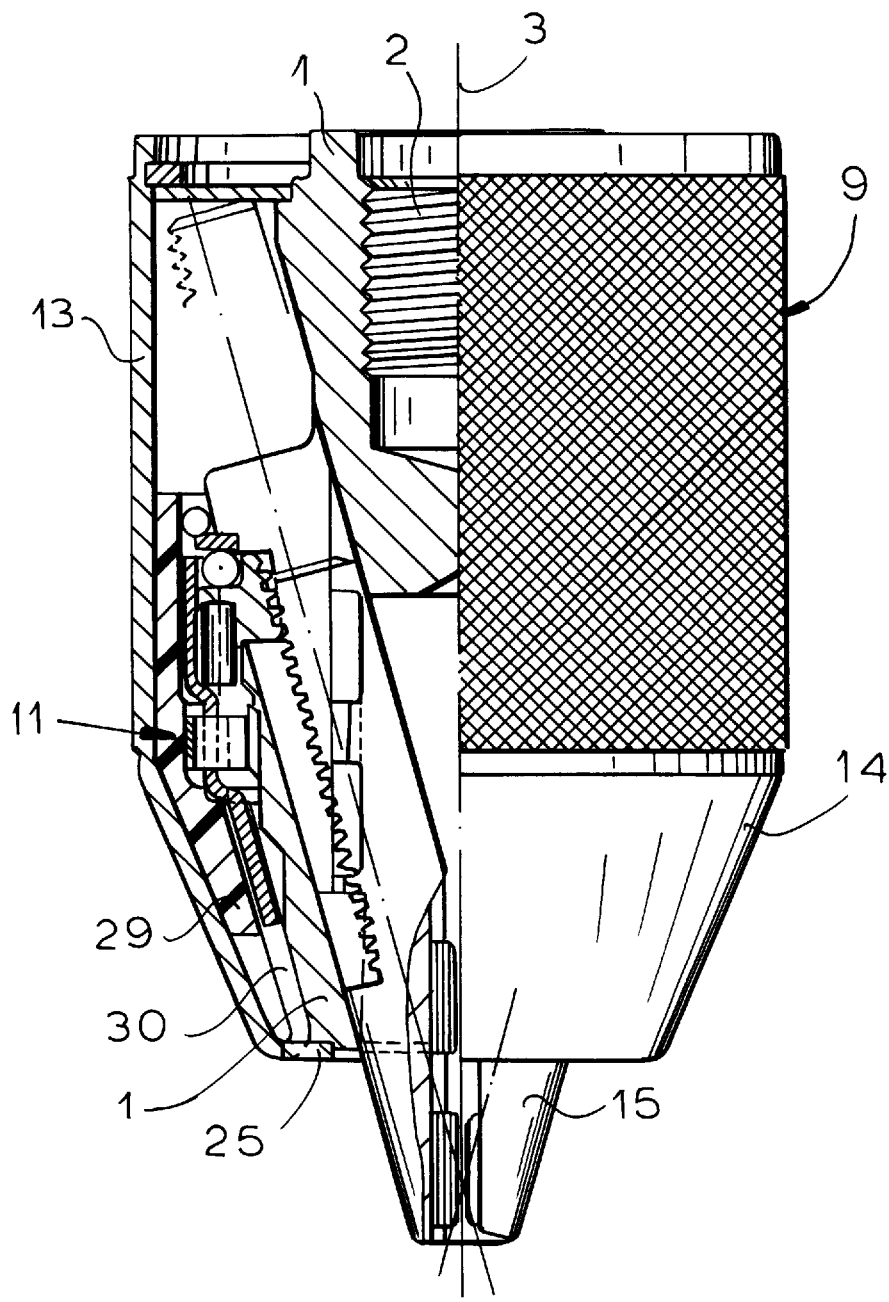

In FIG. 5 the outer sleeve part 15 has a front end that extends all the way past a frustoconically forwardly tapered front end region 14 of the assembly and is turned back in at 24 to ride on the outside of the body 1. The slots 30 are formed in this inner turned back end 24. FIG. 6 shows a variation of this system where the bent-back inner end 24 has an inwardly directed flange 25 set in a groove in the body 1 and captured there by a snap ring 26. In FIG. 7 the flange 25 rests against the front of the body 1.

I claim:

1. A drill chuck comprising;
    a body centered on and rotatable about an axis and formed with a plurality of angled guides opening axially forward at a front chuck end;
    respective jaws axially and radially displaceable in the guides and each formed with a row of teeth;
    a metallic inner ring axially fixed but rotatable about the axis on the body and having a screwthread meshing with the teeth, whereby rotation of the inner ring displaces the jaws in their guides;
    an adjustment sleeve rotatable about the axis on the body and having
        a hard outer part, and
        an inner part of a softer material fixed on the outer part; and
    a metallic intermediate ring fixed on the inner ring and having formations coupled to the hard outer part, the inner part riding on the intermediate ring.

2. The drill chuck defined in claim 1 wherein the outer part is made of metal.

3. The drill chuck defined in claim 1 wherein the inner part is provided with
    means for rotationally arresting the inner and intermediate rings on the body.

4. The drill chuck defined in claim 3 wherein the inner part is made of plastic.

5. The drill chuck defined in claim 3 wherein the inner part is formed with a cam for actuating the arresting means.

6. The drill chuck defined in claim 1 wherein the outer part extends to a rear end of the chuck body.

7. The drill chuck defined in claim 1 wherein the outer part extends to the front end of the chuck body.

8. The drill chuck defined in claim 1 wherein the inner part is formed with angularly extending slots and the intermediate ring has respective integral formations extending into the slots.

9. The drill chuck defined in claim 1 wherein the outer part is frustoconically forwardly tapered at the front end of the chuck body.

10. The drill chuck defined in claim 1, further comprising
    a shield sleeve centered on the axis and surrounding the front end of the chuck body, the shield sleeve having a rear end immediately juxtaposed with a front edge of the outer part.

11. The drill chuck defined in claim 1 wherein the outer part extends to and covers the front end of the chuck body.

12. The drill chuck defined in claim 11 wherein the outer part has at the chuck-body front end a turned-back lip formed with angularly extending slots, the intermediate ring having respective formations extending into and loosely angularly received in the slots.

13. The drill chuck defined in claim 11 wherein the outer part has a front end with an inwardly directed lip braced against the front end of the chuck body.

14. The drill chuck defined in claim 13 wherein the chuck body is provided with a snap ring retaining the outer-part front end in place on the chuck-body front end.

15. The drill chuck defined in claim 1 wherein the outer part has a milled or knurled outer surface.

* * * * *